United States Patent [19]

Kohno et al.

[11] Patent Number: 5,045,622

[45] Date of Patent: Sep. 3, 1991

[54] POLYCARBONATE POLYOL, AROMATIC POLYCARBONATE POLYURETHANE RESIN, COATING AGENT, CAST FILM, MAGNETIC RECORDING MEDIUM

[75] Inventors: Kenji Kohno, Nagaokakyo; Yoshiyuki Nagataki, Osaka; Kazushi Miyata, Osaka; Hiroshi Higashi, Osaka, all of Japan

[73] Assignee: Hitachi Maxell, Ltd., Osaka, Japan

[21] Appl. No.: 368,607

[22] Filed: Jun. 20, 1989

[30] Foreign Application Priority Data

Jun. 22, 1988 [JP] Japan ................... 63-154373

[51] Int. Cl.$^5$ ............... C08G 18/44; C09D 175/06
[52] U.S. Cl. ..................... 528/48; 528/71; 528/72; 528/74; 528/85; 528/370; 528/53; 524/81; 524/196; 525/461
[58] Field of Search ............ 528/48, 53, 71, 72, 528/74, 85, 370; 524/81, 196; 525/461

[56] References Cited

U.S. PATENT DOCUMENTS

| | | | |
|---|---|---|---|
| 2,999,844 | 9/1961 | Müller et al. | 528/85 |
| 3,187,065 | 6/1965 | McPherson et al. | 528/85 |
| 3,215,668 | 11/1965 | Bissiner et al. | 528/85 |
| 3,474,072 | 10/1969 | Bissinger et al. | 528/85 |
| 4,761,338 | 8/1988 | Asano et al. | 428/900 |

*Primary Examiner*—John Kight, III
*Assistant Examiner*—Rabon Sergent

*Attorney, Agent, or Firm*—Birch, Stewart, Kolasch & Birch

[57] ABSTRACT

A polycarbonate polyol having a main chain of the formula:

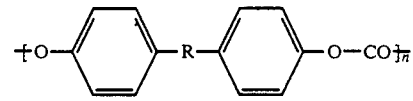

wherein R is an aliphatic or alicyclic hydrcarbon group having 4 to 10 carbon atoms, and n is a number of 2.00 to 20.00, and having an aliphatic OH group at the terminal; an aromatic polycarbonate polyurethane resin prepared from the polycarbonate polyol as set forth above and a polyisocyanate compound having two or more isocyanate groups in the molecule and optionally other components, particularly a chain extender having a polar group; a coating agent comprising the polycarbonate polyol and/or aromatic polycarbonate polyurethane resin as set forth above and optionally a polyisocyanate compound as set forth above and a solvent; a cast film comprising a coating film formed from the polycarbonate polyol and/or aromatic polycarbonate polyurethane resin as set forth above and a base film; and a magnetic recording medium compriisng a magnetic layer formed from the aromatic polycarbonate polyurethane resin as set forth above and optionally the polyisocyanate compound as set forth above, and a base film.

8 Claims, No Drawings

POLYCARBONATE POLYOL, AROMATIC POLYCARBONATE POLYURETHANE RESIN, COATING AGENT, CAST FILM, MAGNETIC RECORDING MEDIUM

The present invention relates to a polycarbonate polyol, an aromatic polycarbonate polyurethane resin prepared from the polycarbonate polyol, and a coating agent, cast film and magnetic recording medium which are prepared by using the polycarbonate polyol and aromatic polycarbonate polyurethane resin.

PRIOR ART

Polyurethane resins prepared from polyesters or polyethers have generally excellent toughness and have widely been used as a coating agent, as a coating film for cast films or magnetic layer or back coat of a magnetic recording medium. However, these conventional polyurethane resins are not necessarily satisfactory in wear resistance, weatherability, hydrolytic resistance and heat resistance.

It has recently been tried to use a polyurethane resin prepared from aromatic polycarbonates which have excellent wear resistance, weatherability, hydrolytic resistance and heat resistance (cf. Japanese Patent First Publication (Kokai) Nos. 58-60430 and 62-195719).

Although the conventional aromatic polycarbonates have excellent wear resistance, weatherability, hydrolytic resistance and heat resistance, they are bisphenol A type compounds and have less solubility in solvents, i.e., they can be dissolved only in certain solvents such as chlorinated compound solvents, and further since they have a phenolic OH group at the terminal of the molecule, it is very difficult to prepare aromatic polycarbonate polyurethane resin by reacting them with a polyisocyanate compound. Accordingly, they can not widely be used as a coating agent or for forming the coating film on cast film or the magnetic layer of magnetic recording medium.

Under the circumstances, the present inventors have intensively conducted a study an aromatic polycarbonate polyurethane resins which are suitable as a coating agent or for coating film on cast film or magetic layer of magnetic recording medium, and have found that desired aromatic polycarbonate polyurethane resins can be obtained by reacting a specific polycarbonate polyol with a polyisocyanate.

BRIEF DESCRIPTION OF THE INVENTION

An object of the present invention is to provide a novel polycarbonate polyol which can give an aromatic polycarbonate polyurethane resin having excellent properties. Another object of the invention is to provide an aromatic polycarbonate polyurethane resin having excellent wear resistance, weatherability, hydrolytic resistance and heat resistance and being easily soluble in various organic solvent and hence is useful as a coating agent, and as a material for forming a coating film on cast film and a magnetic layer on a magnetic recording medium. A further object of the invention is to provide a coating agent. A further object of the invention is to provide a cast film. A still further object of the invention is to provide a magnetic recording medium. These and other objects and advantages of the invention will be apparent from the following description.

DETAILED EXPLANATION OF THE INVENTION

The polycarbonate polyol of the invention has a main chain of the formula:

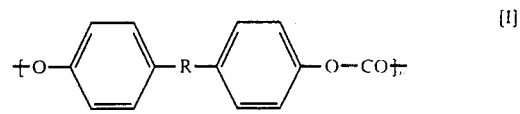

wherein R is an aliphatic hydrocarbon group having 4 to 10 carbon atoms or an alicyclic hydrocarbon group having 4 to 10 carbon atoms and n is a number of 2.00 to 20.00, and has an aliphatic OH group at the terminal.

The polycarbonate polyol can be prepared by introducing an aliphatic OH group at the terminal of a dioxy compound of the formula:

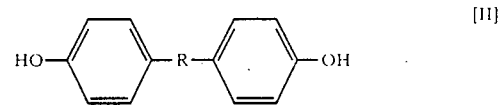

wherein R is as defined above by reacting the dioxy compound with a compound having an aliphatic OH group. The dioxy compound can be prepared by one equivalent amount of a ketone or aldehyde with two equivalent amount of a phenol. By varying the structure of the ketone or aldehyde, there can be obtained various dioxy compounds of the formula [II] wherein R is defined by various groups.

The ketone includes, for example, methyl ethyl ketone, methyl propyl ketone, methyl isopropyl ketone, methyl butyl ketone, methyl isobutyl ketone, cyclopentanone, cyclohexanone, and the like, and the aldehyde includes, for example, butylaldehyde, isobutylaldehyde, valerylaldehyde, isovalerylaldehyde, and the like.

The introduction of the aliphatic OH group to the terminal of the dioxy compound [II] can be carried out, for example, by subjecting the dioxy compound [II] and phosgene to polycondensation reaction with dehydrochlorination and terminating the chloroformate end with a compound having two aliphatic OH groups, or alternatively terminating the chloroformate end with a compound having two aromatic OH groups and then introducing two aliphatic OH groups to said end by reacting with two compounds having epoxy groups. Alternatively, the introduction of the aliphatic OH group can be carried out by subjecting the dioxy compound [II] and phosgene to polycondensation reaction with dehydrochlorination by using an excess amount of the dioxy compound [II], and terminating the chloroformate end with a compound having two aromatic OH groups and reacting the aromatic OH end with a compound an epoxy ring by which the aliphatic OH group is introduced. Further alternatively, the introduction of the aliphatic OH group can be carried out by subjecting the dioxy compound [II] and diphenyl carbonate to polycondensation reaction with dehydrochlorination by using an excess amount of the dioxy compound [II], and terminating the end thereof with a compound having two aromatic OH groups and reacting the aromatic OH end with a compound an epoxy ring by which the aliphatic OH group is introduced.

The compound having two aliphatic OH groups used for the termination of the chloroformate end includes, for example, ethylene glycol, 1,3-propanediol, 1,4-butanediol, 1,5-pentanediol, 1,6-hexanediol, 1,4-benzenedimethanol, 1,4-benzenediethanol, and the like. The compound having two aromatic OH groups used optionally includes, for example, hydroquinone, 4,4-bisphenol, bisphenol A and also the starting dioxy compound. The compound having an epoxy group used for reacting with the compound having two aromatic OH groups in order to introduce an aliphatic OH group includes, for example, ethylene oxide, propylene oxide, 1,2-butylene oxide, 2,3-butylene oxide, 1,2-epoxyhexane, and the like.

The polycarbonate polyol thus prepared has the formula [I] as set forth hereinbefore wherein R is a divalent aliphatic hydrocarbon group having 4 to 10 carbon atoms (e.g. methylethylmethylene, methylpropylmethylene, methylisopropylmethylene, methylbutylmethylene, methylisobutylmethylene, propylmethylene, butylmethylene, isobutylmethylene, etc.) or a divalent alicyclic hydrocarbon group having 4 to 10 carbon atoms (e.g. cyclopentylene, cyclohexylene, etc.), and n (the degree of polymerization) is 2 to 20. When the R is an aliphatic or alicyclic hydrocarbon group having less than 4 carbon atoms, the polycarbonate polyol has unfavorably less solubility in the solvent and hence is less useful. On the other hand, when the R is an aliphatic or alicyclic hydrocarbon group having more than 20 carbon atoms, the characteristics of polycarbonate are not exhibited sufficiently because of higher ratio of the aliphatic group and can not show sufficient wear resistance and heat resistance. Besides, when n is less than 2, the coating film and resin obtained therefrom are too hard, which is not suitable for practical use, and on the other hand, when n is over 20, the polycarbonate polyurethane resin obtained therefrom can not show sufficient characteristics of the urethane bond and hence can not exhibit excellent wear resistance.

The polycarbonate polyol is reacted with a polyisocyanate compound having two or more isocyanate groups in the molecule to give an aromatic polycarbonate polyurethane resin having excellent wear resistance, weatherability, hydrolytic resistance and heat resistance and being easily soluble in conventional organic solvents and hence can widely be used as a coating agent, or for forming a coating film on cast film or a magnetic layer of magnetic recording medium. The reaction is usually carried out by using 1 to 5 equivalents of the polyisocyanate compound to 1 equivalent of the polycarbonate polyol in a suitable organic solvent (e.g. cyclohexanone, methyl ethyl ketone, toluene, methylene chloride, etc.).

In the reaction of the polycarbonate polyol and the polyisocyanate compound having two or more isocyanate groups in the molecule, there may optionally be used a chain extender having a polar group to introduce polar group(s) such as hydroxy group, carboxyl group, phosphoric acid group, sulfonic acid group, tertiary amino group or a salt thereof into the molecule of the aromatic polycarbonate polyurethane resin, by which the resin shows excellent wear resistance, weatherability, hydrolytic resistance and heat resistance and shows high solubility in organic solvents and hence can show improved affinity to the polar surface of the substrate, filling agents and magnetic particles and also improved interface adhesion strength when used as a coating agent or for forming coating film on cast film or magnetic layer of magnetic recording medium.

Since the polycarbonate polyol has an aliphatic OH group, when the polycarbonate polyol is reacted with a polyisocyanate having two or more isocyanate groups in the molecule and optionally a chain extender, the aliphatic OH group reacts easily with the isocyanate group of the isocyanate compound to give the desired aromatic polycarbonate polyurethane resin.

The aromatic polycarbonate polyurethane resin thus prepared has high solubility in organic solvents and is easily soluble in conventional organic solvents such as cyclohexanone, methyl ethyl ketone, toluene, methylene chloride, and the like. Besides, since it has a structure containing an aromatic ring derived from the polycarbonate polyol component, the resin has excellent wear resistance, weatherability, hydrolytic resistance and heat resistance and further has excellent hot water resistance owing to the carbonate group having hot water resistance.

The polyisocyanate compound having two or more isocyanate groups in the molecule includes, for example, tolyenediisocyanate, 4,4-diphenylmethanediisocyanate, hexamethylenediisocyanate, 4,4-dicyclohexylmethanediisocyanate, isophoronediisocyanate, trifunctional lower molecular weight isocyanate compounds which are prepared by reacting one mole of a triol and three moles of a diisocyanate, and the like.

The chain extender having no polar group includes, for example, polyhydric alcohols, such as 1,3-propanediol, 1,2-propanediol, 1,4-butanediol, 1,3-butanediol, 1,2-butanediol, 1,5-pentanediol, neopentyl glycol, 1,7-heptanediol, 1,8-octanediol, ethylene glycol, diethylene glycol, triethylene glycol, 1,4-cyclohexanediol, etc.; diamines such as ethylenediamine, tolylenediamine; water; and the like.

The chain extender having a polar group includes, for example, compounds having a carboxyl group, such as diols (e.g. dimethylolpropionic acid, dihydroxytartaric acid, tartaric acid, glyceric acid, etc.), diamines (e.g. 1,3-diamino-2-carboxypropane, DL-α,ε-diaminopimelic acid, 3,5-diaminobenzoic acid, 2,5-diaminopentanoic acid, 2,3-diaminopropionic acid, etc.), and the like; compounds having hydroxy group, such as diamines (e.g. 1,3-diamino-2-propanol, 1,5-diamino-3-pentanol, etc.), and the like. The chain extender also includes the compounds prepared by reacting a polyurethane having a carboxyl group, which is prepared by using a chain extender having a carboxyl group, with a compound having an epoxy group (e.g. propylene oxide, 1,2-butylene oxide, 2,3-butylene oxide, phenyl glycidyl ether, 2-ethylhexyl glycidyl ether, etc.), whereby the carboxyl group is converted into a hydroxy group. The chain extender having a sulfonic acid group or a salt thereof includes, for example, sodium bis(4-hydroxybutyl)-5-sulfoisophthalate, sodium bis(4-hydroxyethyl)-5-sulfoisophthalate, N-2-hydroxyethylpiperazine-N-2-hydroxypropane-3-sulfonic acid, piperazine-N,N-bis(2-hydroxypropane)-3-sulfonic acid, and the like. The chain extender having a tertiary amino group or a salt thereof includes, for example, N-methyldiethanolamine, N-ethyldiethanolamine, 3-diethylamino-1,2-propanediol, 2,3-dihydroxypyridine, 2,6-pyridinedimethanol, 4,6-dihydroxypyrimidine, 3,3-diamino-N-methyldipropylamine, 2,6-diaminopyridine, 3,5-pyridinedicarboxylic acid, and a salt thereof with an acid or a halogenated compound. The chain extender having a phosphoric acid group or a salt thereof includes, for example, sodium β-glycerophosphate and compounds of the following formulae:

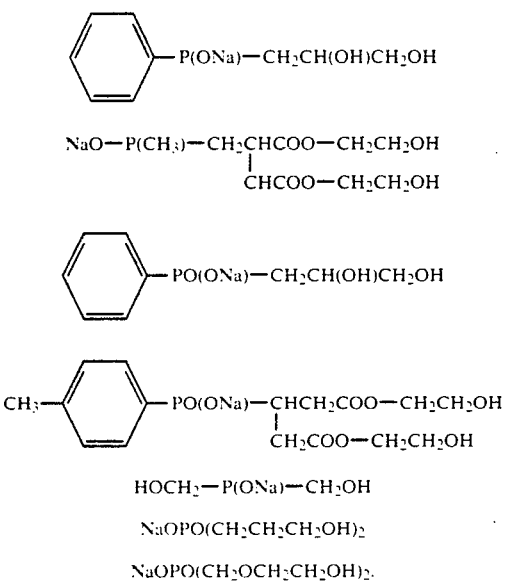

These chain extenders may be used alone or in combination of two or more. The chain extender is usually used in an amount of 0 to 4 equivalents to 1 equivalent of the polycarbonate polyol.

From the aromatic polycarbonate polyurethane resin thus prepared, there are prepared a coating agent, a cast film, a magnetic layer for magnetic recording medium.

That is, the aromatic polycarbonate polyurethane resin is dissolved in an appropriate organic solvent to prepare a coating agent. When the coating agent is applied to a base film to give a cast film useful as a protecting film or a film for envelope which has excellent wear resistance, weatherability, hydrolytic resistance and heat resistance. When the chain extender having a polar group is used in the preparation of the aromatic polycarbonate polyurethane resin as mentioned above, owing to the function of the polar groups such as hydroxy group, carboxyl group, phosphoric acid group, sulfonic acid group, tertiary amino group, or a salt thereof contained in the aromatic polycarbonate polyurethane resin, the adhesion of the coating agent to the base film is more improved.

Besides, the aromatic polycarbonate polyurethane resin is mixed and dispersed with magnetic particles, organic solvent and other conventional components to give a magnetic coating composition. In the composition, the aromatic polycarbonate polyurethane and the magnetic particles are mixed in a ratio of 5:5 to 1:9 by weight, and both components are dispersed in the organic solvent in a ratio of 5:5 to 1:9 by weight (total amount of both components : the amount of the organic solvent). The magnetic coating composition thus prepared is applied to a base film to form a magnetic layer having excellent wear resistance, weatherability, hydrolytic resistance and heat resistance on the base film, by which there is prepared a magnetic recording medium having excellent durability. When the chain extender having a polar group is used in the preparation of the aromatic polycarbonate polyurethane resin as mentioned above, owing to the function of the polar groups such as hydroxy group, carboxyl group, phosphoric acid group, sulfonic acid group, tertiary amino group, or a salt thereof contained in the aromatic polycarbonate polyurethane resin, the coating composition adheres well onto the surface of the magnetic particles and hence the surface of the magnetic particles is well covered with the aromatic polycarbonate polyurethane resin, by which the dispersibility of the magnetic particles is more improved to give a magnetic recording medium having superior electrical characteristics. Moreover, when a back coat, top coat, or under coat of the magnetic recording medium is formed by using the aromatic polycarbonate polyurethane resin, the obtained magnetic recording medium shows sufficiently improved durability.

The coating agent, cast film and magnetic layer may be prepared by using the starting polycarbonate polyol, a polyisocyanate compound having two or more isocyanate groups in the molecule and other component in stead of previous preparation of the aromatic polycarbonate polyurethane resin. That is, the polycarbonate polyol used as a starting material for the aromatic polycarbonate polyurethane resin, a polyisocyanate compound having two or more isocyanate groups in the molecule, and optionally other components are dissolved in an appropriate organic solvent to prepare a coating agent, wherein the polyisocyanate compound is used in an amount of 1 to 5 equivalents to 1 equivalent of the polycarbonate polyol, and the coating agent is applied to a base film, followed by subjecting to heat treatment, by which an aromatic polycarbonate polyurethane resin is prepared in the coating film. The cast film such as protecting film or a film for envelope prepared in the above manner has also excellent wear resistance, weatherability, hydrolytic resistance and heat resistance. Likewise, the above starting materials are mixed with magnetic particles and other conventional components to prepare a magnetic coating composition, and the magnetic coating composition is applied to a base film, followed by subjecting to heat treatment, by which an aromatic polycarbonate polyurethane resin is prepared in the coated film to give the desired magnetic recording medium having excellent electrical characteristics and durability. The back coat, top coat or under coat of the magnetic recording medium may also be applied by the above magnetic coating composition prepared from the starting materials, followed by subjecting to heat treatment, by which the magnetic recording medium having excellent durability can be obtained.

Moreover, when the aromatic polycarbonate polyurethane resin is used together with a polyisocyanate compound having two or more isocyanate groups in the molecule in the preparation of a coating agent, cast film (e.g. protecting film, film for envelope) and magnetic recording medium, there can be obtained the coating agent, cast film and magnetic recording medium which have more improved wear resistance, weatherability, hydrolytic resistance and heat resistance.

The isocyanate compound used for such a purpose includes, for example, a trifunctional, low molecular weight isocyanate compound which is prepared by reacting one mole of a triol and three moles of a diisocyanate. Such an isocyanate compound is commercially available, for example, Colonate L (manufactured by Nippon Polyurethane Kogyo K.K.), Desmodule L (manufactured by Bayer), Takenate D102 (manufactured by Takeda Chemical Industries, Ltd.), and the like.

Besides, for forming a magnetic layer with the aromatic polycarbonate polyurethane resin, the conventional binding resins for magnetic recording medium may also be incorporated into the coating composition. The binding resins include, for example polyurethane resins, fibrous resins, vinyl chloride-vinyl acetate copolymer, vinyl acetal resins, polyester resins, vinylidene chloride resins, phenoxy resins, acrylic resins, epoxy resins, rubber resins, and the like.

In the preparation of a magnetic recording medium by using the aromatic polycarbonate polyurethane resin, there are used conventional magnetic particles, such as $\gamma\text{-}Fe_2O_3$, $Fe_3O_4$, an intermediate oxide product of $\gamma\text{-}Fe_2O_3$ and $Fe_3O_4$, Co-containing $\gamma\text{-}Fe_2O_3$, Co-containing $Fe_3O_4$, $CrO_2$, Ba ferrite, Sr ferrite, Fe alloys, Co alloys, Ni alloys, and the like.

The organic solvents include the conventional organic solvents which are usually used in the preparation of a magnetic recording medium, such as methyl isobutyl ketone, methyl ethyl ketone, cyclohexanone, toluene, ethyl acetate, tetrahydrofuran, dioxane, dimethylformamide, etc., which are used alone or in combination of two or more.

The magnetic coating composition may also be incorporated with the conventional additives, such as lubricants, abrasives, dispersing agents, antistatics, fillers, and the like.

The invention is illustrated by the following Examples but should not be construed to be limited thereto.

EXAMPLE 1

Phenol (22.5 parts by weight), cyclohexanone (6 parts by weight) and conc. hydrochloric acid (2.5 parts by weight) are charged into a flask provided with a stirrer, a thermometer and a reflux condenser and are mixed at 40° C. for 48 hours. The precipitated crystal is separated by filtration and recrystallized from 20% aqueous acetic acid solution to give a dioxy compound of the formula:

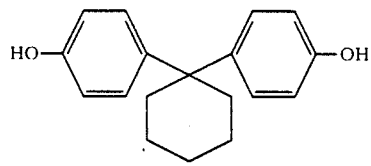

The thus prepared dioxy compound (27 parts by weight) is mixed with pyridine (18 parts by weight) and methylene chloride (200 parts by weight) and to the mixture is added phosgene (12 parts by weight) with stirring at 20°–25° C. and is further added 1,4-benzenediethanol (20 parts by weight), and the mixture is continuously stirred for 2 hours. The reaction mixture is treated with methanol to reprecipitate the product. The precipitate is separated and dried under reduced pressure at 50° C. for 48 hours to give a polycarbonate diol. The polycarbonate diol has a number average molecular weight of $2.1 \times 10^3$ (measured with gas permeation chromatography (GPC), polystyrene conversion) and an OH content of $9.3 \times 10^{-3}$ mole/g.

By using the polycarbonate diol, a coating agent is prepared in the following formulation.

| | | |
|---|---|---|
| Polycarbonate diol | 80 | parts by weight |
| Colonate L (trifunctional, low molecular weight isocyanate compound, manufactured by Nippon Polyurethane Kogyo K.K.) | 20 | " |

-continued

| | | |
|---|---|---|
| Toluene | 400 | " |

The coating agent prepared by mixing well the above components is applied onto a polyester film and dried with hot air to give a cast film (thickness in dry state, 10 μm).

EXAMPLE 2

In the same manner as described in Example 1 except that the same amount of methyl isobutyl ketone is used instead of cyclohexanone, a dioxy compound is prepared.

The thus prepared dioxy compound (27 parts by weight) is mixed with pyridine (18 parts by weight) and methylene chloride (200 parts by weight) and to the mixture is added phosgene (9 parts by weight) with stirring at 20°–25° C. The reaction mixture is treated with methanol to reprecipitate the product. The precipitate is separated and dried under reduced pressure at 50° C. for 48 hours. The dried product is dissolved in methylene chloride (150 parts by weight) and thereto is added 1,8-diazabicyclo[5.4.0]-undecene-7 (0.02 part by weight, as a catalyst) and is further added ethylene oxide (40 parts by weight) and the mixture is reacted at 60° C. for 12 hours. After distilling off the excess amount of ethylene oxide, the reaction mixture is treated with methanol to reprecipitate the product. The precipitate is dried under reduced pressure at 50° C. for 48 hours to give a polycarbonate diol. The polycarbonate diol has a number average molecular weight of $1.8 \times 10^3$ (measured with GPC, polystyrene conversion) and an OH content of $1.0 \times 10^{-3}$ mole/g.

In the same formulation for coating agent as described in Example 1 except that the same amount of the polycarbonate diol obtained above is used instead of the polycarbonate diol used in Example 1, a coating agent is prepared and further a cast film is prepared likewise.

EXAMPLE 3

In the same manner as described in Example 1 except that valerylaldehyde (5 parts by weight) is used instead of cyclohexanone, a dioxy compound is prepared.

The thus prepared dioxy compound (25.5 parts by weight) is mixed with diphenyl carbonate (19 parts by weight) and to the mixture is added lithium hydroxide (0.02 part by weight, as a catalyst), and the mixture is reacted under reduced pressure of 100 mmHg at 200° C. for 3 hours while distilling phenol, and further reacted under reduced pressure of about 1 mmHg at about 300° C. for 5 hours while distilling phenol. The reaction product is dissolved in methylene chloride (200 parts by weight) and thereto is added 1,8-diazabicyclo[5.4.0]undecene-7 (0.02 part by weight, as a catalyst) and is further added ethylene oxide (45 parts by weight) and the mixture is reacted at 60° C. for 12 hours. After distilling off the excess amount of ethylene oxide, the reaction mixture is treated with methanol to reprecipitate the product. The precipitate is dried under reduced pressure at 50° C. for 48 hours to give a polycarbonate diol. The polycarbonate diol has a number average molecular weight of $1.7 \times 10^3$ (measured with GPC, polystyrene conversion) and an OH content of $1.1 \times 10^{-3}$ mole/g.

In the same formulation for coating agent as described in Example 1 except that the same amount of the polycarbonate diol obtained above is used instead of the polycarbonate diol used in Example 1, a coating agent is prepared and further a cast film is prepared likewise.

EXAMPLE 4

By using the polycarbonate diol prepared in Example 1, an aromatic polycarbonate polyurethane resin is prepared in the following formulation.

| Polycarbonate diol | 210 | parts by weight |
|---|---|---|
| 4,4-Diphenylmethane diisocyanate | 50 | " |
| 1,4-Butanediol | 9 | " |
| Tin octate | 0.05 | " |
| Cyclohexanone | 100 | " |
| Toluene | 100 | " |

The above components are mixed and reacted with stirring at 80° C. until the reaction product has a sufficiently large molecular weight. The reaction product is dissolved in a mixed solvent of cyclohexanone and toluene to give a 20% by weight aromatic polycarbonate polyurethane resin solution. The aromatic polycarbonate polyurethane resin thus obtained has a number average molecular weight of $4.0 \times 10^4$ (measured with GPC, polystyrene conversion).

By using the aromatic polycarbonate polyurethane resin solution obtained above, a coating agent is prepared in the following formulation.

| Aromatic polycarbonate polyurethane resin solution | 80 | parts by weight |
|---|---|---|
| Colonate L (trifunctional, low molecular weight isocyanate compound, manufactured by Nippon Polyurethane Kogyo K.K.) | 20 | " |
| Toluene | 400 | " |

The coating agent prepared by mixing well the above components is applied onto a polyester film and dried with hot air to give a cast film (thickness in dry state, 10 μm).

EXAMPLE 5

In the same manner as described in Example 4 except that the polycarbonate diol prepared in Example 2 (180 parts by weight) is used instead of the polycarbonate diol used in Example 1, an aromatic polycarbonate polyurethane resin solution is prepared, and further by using the aromatic polycarboante polyurethane resin solution thus obtained, there are prepared a coating agent and further a cast film likewise.

The aromatic polycarbonate polyurethane resin obtained above has a number average molecular weight of $4.3 \times 10^4$ (measured with GPC, polystyrene conversion).

EXAMPLE 6

In the same manner as described in Example 4 except that the polycarbonate diol prepared in Example 3 (170 parts by weight) is used instead of the polycarbonate diol used in Example 1, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $4.1 \times 10^4$ (measured with GPC, polystyrene conversion).

EXAMPLE 7

In the same manner as described in Example 4 except that 1,4-butanediol is used in an amount of 6 parts by weight instead of 9 parts by weight and further dimethylolpropionic acid (4.5 parts by weight) is used, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $2.5 \times 10^3$ (measured with GPC, polystyrene conversion).

EXAMPLE 8

In the same manner as described in Example 5 except that 1,4-butanediol is used in an amount of 6 parts by weight instead of 9 parts by weight and further dimethylolpropionic acid (4.5 parts by weight) is used, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $2.1 \times 10^3$ (measured with GPC, polystyrene conversion).

EXAMPLE 9

In the same manner as described in Example 6 except that 1,4-butanediol is used in an amount of 6 parts by weight instead of 9 parts by weight and further dimethylolpropionic acid (4.5 parts by weight) is used, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $2.2 \times 10^3$ (measured with GPC, polystyrene conversion).

EXAMPLE 10

In the same manner as described in Example 4 except that 1,4-butanediol is used in an amount of 6 parts by weight instead of 9 parts by weight and further sodium bis-(4-hydroxybutyl)-5-sulfoisophthalate (13.5 parts by weight) is used, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $2.4 \times 10^3$ (measured with GPC, polystyrene conversion).

EXAMPLE 11

In the same manner as described in Example 4 except that 1,4-butanediol is used in an amount of 6 parts by weight instead of 9 parts by weight and further N-methyldiethanolamine (4.0 parts by weight) is used, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $2.0 \times 10^3$ (measured with GPC, polystyrene conversion).

EXAMPLE 12

In the same manner as described in Example 4 except that 1,4-butanediol is used in an amount of 6 parts by weight instead of 9 parts by weight and further 1,3-diamino-2-propanol (3.0 parts by weight) is used, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $2.3 \times 10^3$ (measured with GPC, polystyrene conversion).

EXAMPLE 13

In the same manner as described in Example 4 except that 1,4-butanediol is used in an amount of 6 parts by weight instead of 9 parts by weight and further sodium $\beta$-glycerophosphate (7.2 parts by weight) is used, an aromatic polycarbonate polyurethane resin solution is prepared, and further by using the aromatic polycarbonate polyurethane resin solution thus obtained, there are prepared a coating agent and further a cast film likewise.

The aromatic polycarbonate polyurethane resin obtained above has a number average molecular weight of $2.1 \times 10^3$ (measured with GPC, polystyrene conversion).

EXAMPLE 14

By using the aromatic polycarbonate polyurethane resin solution prepared in Example 4, a magnetic coating composition is prepared in the following formulation.

| | | |
|---|---|---|
| Co-containing $\gamma$-Fe$_2$O$_3$ particles | 100 | parts by weight |
| Vinyl chloride-vinyl acetate vinyl alcohol copolymer (VAGH, manufactured by U.C.C., U.S.A.) | 10 | " |
| Aromatic polycarbonate polyurethane resin solution | 10 | " |
| Carbon black | 4 | " |
| Alumina | 5 | " |
| n-Butyl stearate | 1 | " |
| Palmitic acid | 1 | " |
| Methyl ethyl ketone | 120 | " |
| Toluene | 120 | " |

The above components are mixed and dispersed in a ball mill for 70 hours and thereto is added a trifunctional low molecular weight isocyanate compound (Colonate L, manufactured by Nippon Polyurethane Kogyo K.K.) (5 parts by weight), and the mixture is mixed and dispersed for one hour to give a magnetic coating composition.

The magnetic coating composition is applied onto a polyester base film (thickness, 14 μm) and dried to form a magnetic layer (thickness in dry state, 4 μm), and the resultant is subjected to calendering and then cut in a prescribed width to give a magnetic tape.

EXAMPLE 15

In the same formulation for magnetic coating composition as described in Example 14 except that the same amount of the aromatic polycarbonate polyurethane resin solution prepared in Example 5 is used instead of the aromatic polycarbonate polyurethane resin solution used in Example 14, a magnetic tape is prepared likewise.

EXAMPLE 16

In the same formulation for magnetic coating composition as described in Example 14 except that the same amount of the aromatic polycarbonate polyurethane resin solution prepared in Example 6 is used instead of the aromatic polycarbonate polyurethane resin solution used in Example 14, a magnetic tape is prepared likewise.

EXAMPLE 17

In the same formulation for magnetic coating composition as described in Example 14 except that the same amount of the aromatic polycarbonate polyurethane resin solution prepared in Example 7 is used instead of the aromatic polycarbonate polyurethane resin solution used in Example 14, a magnetic tape is prepared likewise.

EXAMPLE 18

In the same formulation for magnetic coating composition as described in Example 14 except that the same amount of the aromatic polycarbonate polyurethane resin solution prepared in Example 8 is used instead of the aromatic polycarbonate polyurethane resin solution used in Example 14, a magnetic tape is prepared likewise.

EXAMPLE 19

In the same formulation for magnetic coating composition as described in Example 14 except that the same amount of the aromatic polycarbonate polyurethane resin solution prepared in Example 9 is used instead of the aromatic polycarbonate polyurethane resin solution used in Example 14, a magnetic tape is prepared likewise.

EXAMPLE 20

In the same formulation for magnetic coating composition as described in Example 14 except that the same amount of the aromatic polycarbonate polyurethane resin solution prepared in Example 10 is used instead of the aromatic polycarbonate polyurethane resin solution used in Example 14, a magnetic tape is prepared likewise.

EXAMPLE 21

In the same formulation for magnetic coating composition as described in Example 14 except that the same amount of the aromatic polycarbonate polyurethane resin solution prepared in Example 11 is used instead of the aromatic polycarbonate polyurethane resin solution used in Example 14, a magnetic tape is prepared likewise.

EXAMPLE 22

In the same formulation for magnetic coating composition as described in Example 14 except that the same amount of the aromatic polycarbonate polyurethane resin solution prepared in Example 12 is used instead of the aromatic polycarbonate polyurethane resin solution used in Example 14, a magnetic tape is prepared likewise.

EXAMPLE 23

In the same formulation for magnetic coating composition as described in Example 14 except that the same amount of the aromatic polycarbonate polyurethane resin solution prepared in Example 13 is used instead of the aromatic polycarbonate polyurethane resin solution used in Example 14, a magnetic tape is prepared likewise.

REFERENCE EXAMPLE 1

In the same formulation for coating agent as described in Example 1 except that the same amount of bisphenol A is used instead of the polycarbonate diol used in Example 1 and further methylene chloride (600 parts by weight) is used instead of toluene (400 parts by weight), there are prepared a coating agent and also a cast film likewise.

REFERENCE EXAMPLE 2

In the same manner as described in Example 4 except that an aliphatic polycarbonate prepared from 1,6-hexanediol and diethyl carbonate (S-8200, manufactured by Asahi Glass Co., Ltd., number average molecular weight: $2 \times 10^3$, OH content: $9.8 \times 10^{-4}$ mole/g) (200 parts by weight) is used instead of the polycarbonate diol used in Example 4, an aliphatic polycarbonate polyurethane resin solution is prepared, and further by using the aliphatic polycarbonate polyurethane resin solution thus obtained, there are prepared a coating agent and further a cast film likewise.

The aliphatic polycarbonate polyurethane resin obtained above has a number average molecular weight of $4.3 \times 10^4$ (measured with GPC, polystyrene conversion).

REFERENCE EXAMPLE 3

In the same manner as described in Example 4 except that a polyester prepared from 1,4-butanediol and adipic acid (Polylight OD-X-668, manufactured by Dainippon Ink and Chemicals, Inc., number average molecular weight: $2 \times 10^3$, OH content: $1.0 \times 10^{-4}$ mole/g) (200 parts by weight) is used instead of the polycarbonate diol used in Example 4, an aliphatic polycarbonate polyurethane resin solution is prepared, and further by using the aliphatic polycarbonate polyurethane resin solution thus obtained, there are prepared a coating agent and further a cast film likewise.

The aliphatic polycarbonate polyurethane resin obtained above has a number average molecular weight of $4.2 \times 10^4$ (measured with GPC, polystyrene conversion).

REFERENCE EXAMPLE 4

In the same manner as described in Reference Example 2 except that 1,4-butanediol is used in an amount of 6 parts by weight instead of 9 parts by weight and further dimethylolpropionic acid (4.5 parts by weight) is used, an aliphatic polycarbonate polyurethane resin solution is prepared, and further by using the aliphatic polycarbonate polyurethane resin solution thus obtained, there are prepared a coating agent and further a cast film likewise.

The aliphatic polycarbonate polyurethane resin obtained above has a number average molecular weight of $2.0 \times 10^3$ (measured with GPC, polystyrene conversion).

REFERENCE EXAMPLE 5

In the same manner as described in Reference Example 3 except that 1,4-butanediol is used in an amount of 6 parts by weight instead of 9 parts by weight and further dimethylolpropionic acid (4.5 parts by weight) is used, an aliphatic polycarbonate polyurethane resin solution is prepared, and further by using the aliphatic polycarbonate polyurethane resin solution thus obtained, there are prepared a coating agent and further a cast film likewise.

The aliphatic polycarbonate polyurethane resin obtained above has a number average molecular weight of $2.3 \times 10^3$ (measured with GPC, polystyrene conversion).

REFERENCE EXAMPLE 6

In the same formulation for magnetic coating composition as described in Example 14 except that the same amount of the aliphatic polycarbonate polyurethane resin solution prepared in Reference Example 2 is used instead of the aromatic polycarbonate polyurethane resin solution used in Example 14, a magnetic tape is prepared likewise.

REFERENCE EXAMPLE 7

In the same formulation for magnetic coating composition as described in Example 14 except that the same amount of the aliphatic polycarbonate polyurethane resin solution prepared in Reference Example 3 is used instead of the aromatic polycarbonate polyurethane resin solution used in Example 14, a magnetic tape is prepared likewise.

REFERENCE EXAMPLE 8

In the same formulation for magnetic coating composition as described in Example 14 except that the same amount of the aliphatic polycarbonate polyurethane resin solution prepared in Reference Example 4 is used instead of the aromatic polycarbonate polyurethane resin solution used in Example 14, a magnetic tape is prepared likewise.

REFERENCE EXAMPLE 9

In the same formulation for magnetic coating composition as described in Example 14 except that the same amount of the aliphatic polycarbonate polyurethane resin solution prepared in Reference Example 5 is used instead of the aromatic polycarbonate polyurethane resin solution used in Example 14, a magnetic tape is prepared likewise.

As to the cast films prepared in Examples 1 to 13 and Reference Examples 1 to 5, the insoluble part in the preparation of the cast films was measured by using methylene chloride, and the gel ratio was calculated. Besides, the wear resistance was evaluated by the haze, where the haze was determined by measuring lowering of the permeability due to wearing. The results are shown in Table 1.

TABLE 1

| Example No. | Gel ratio (%) | Haze (%) |
|---|---|---|
| Example 1 | 85 | 9.0 |
| Example 2 | 87 | 10 |

TABLE 1-continued

| Example No. | Gel ratio (%) | Haze (%) |
| --- | --- | --- |
| Example 3 | 82 | 8.5 |
| Example 4 | — | 9.5 |
| Example 5 | — | 16 |
| Example 6 | — | 11 |
| Example 7 | — | 12 |
| Example 8 | — | 20 |
| Example 9 | — | 13 |
| Example 10 | — | 13 |
| Example 11 | — | 15 |
| Example 12 | — | 24 |
| Example 13 | — | 13 |
| Ref. Ex. 1 | 18 | 6.0 |
| Ref. Ex. 2 | — | 30 |
| Ref. Ex. 3 | — | 42 |
| Ref. Ex. 4 | — | 32 |
| Ref. Ex. 5 | — | 47 |

As to the magnetic tapes prepared in Examples 14 to 23 and Reference Examples 6 to 9, the chroma S/N ratio and durability were measured. The chroma S/N ratio was determined by reproducing the chroma signal on a video tape with VHS type VTR and measuring the noise of the reproduced signal with a chroma noise meter. The chroma S/N ratio was shown in a relative value to the reference value (0 dB) of the video tape of Reference Example 6. Besides, the durability was determined by reproducing with still mode as to the magnetic tape which was kept at 20° C., 40% relative humidity (RH) for 4 weeks and the magnetic tape which was kept at 60° C., 90% RH for 4 weeks, respectively, and recording the output level of the reproduced RF, and then measuring the time until the signal level lowered to ½. The results are shown in Table 2.

TABLE 2

| Example No. | Chroma S/N ratio (dB) | Durability (minute) | | | |
| --- | --- | --- | --- | --- | --- |
| | | Kept at 20° C., 40% RH | | Kept at 60° C., 90% RH | |
| | | 20° C. | 40° C. | 20° C. | 40° C. |
| Example 14 | 0 | >120 | >120 | >120 | >120 |
| Example 15 | 0 | " | " | " | " |
| Example 16 | 0 | " | " | " | " |
| Example 17 | 1.2 | " | " | " | " |
| Example 18 | 1.1 | " | " | " | 100 |
| Example 19 | 1.2 | " | " | " | 110 |
| Example 20 | 0.9 | " | " | " | >120 |
| Example 21 | 1.2 | " | " | " | " |
| Example 22 | 0.8 | " | " | " | " |
| Example 23 | 0.9 | " | " | " | 90 |
| Ref. Ex. 6 | 0 | 90 | 70 | 60 | 40 |
| Ref. Ex. 7 | 0 | 60 | 40 | 20 | 10 |
| Ref. Ex. 8 | 1.2 | 70 | 50 | 50 | 30 |
| Ref. Ex. 9 | 1.2 | 70 | 50 | 15 | 5 |

As is clear from the results shown in Table 1, the cast films prepared in Examples 1 to 13 had a higher gel ratio and less haze than those of the cast films prepared in Reference Examples 1 to 15, from which it is clear that the aromatic polycarbonate polyurethane resins, coating agents and cast films of the present invention have superior wear resistance, weatherability, hydrolytic resistance and heat resistance.

Besides, as is clear from the results in Table 2, the magnetic tapes prepared in Examples 14 to 23 showed higher chroma S/N ratio and better durability than those of the magnetic tapes prepared in Reference Examples 6 to 9, from which it is clear that the magnetic recording medium obtained by the present invention has superior magnetic transducing characteristics and superior durability.

What is claimed is:

1. An aromatic polycarbonate polyurethane resin comprising the reaction product of from a polycarbonate polyol having a main chain of the formula:

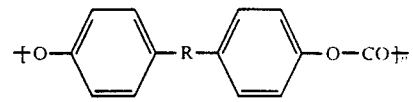

wherein R is an aliphatic hydrocarbon group having 4 to 10 carbon atoms or an alicyclic hydrocarbon group having 4 to 10 carbon atoms and n is a number of 2.00 to 20.00, and having an aliphatic OH group at the terminal; and a polyisocyanate compound having two or more isocyanate groups in the molecule; and optionally other component.

2. The aromatic polycarbonate polyurethane resin according to claim 1, wherein the other component is a chain extender having a polar group selected from hydroxy group, carboxyl group, phosphoric acid group, sulfonic acid group, tertiary amino group, or a salt thereof.

3. A coating agent which comprises a polycarbonate polyol which has a main chain of the formula:

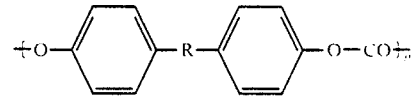

wherein R is an aliphatic hydrocarbon group having 4 to 10 carbon atoms or an alicyclic hydrocarbon group having 4 to 10 carbon atoms and n is a number of 2.00 to 20.00, and has an aliphatic OH group at the terminal; a polyisocyanate compound having two or more isocyanate groups in the molecule; and a solvent.

4. A coating agent which comprises the aromatic polycarbonate polyurethane resin as set forth in claim 1, and a solvent.

5. A coating agent which comprises the aromatic polycarbonate polyurethane resin as set forth in claim 1, a polyisocyanate compound having two or more isocyanate groups in the molecule, and a solvent.

6. A cast film which comprises a coating film formed from a polycarbonate polyol which has a main chain of the formula:

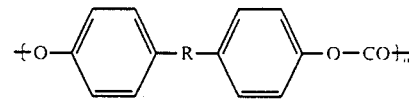

wherein R is an aliphatic hydrocarbon group having 4 to 10 carbon atoms or an alicyclic hydrocarbon group having 4 to 10 carbon atoms and n is a number of 2.00 to 20.00, and has an aliphatic OH group at the terminal; and a polyisocyanate compound having two or more isocyanate groups in the molecule.

7. A cast film which comprises a coating film formed from the aromatic polycarbonate polyurethane resin as set forth in claim 1.

8. A cast film which comprises a coating film formed from the aromatic polycarbonate polyurethane resin as set forth in claim 1 and a polyisocyanate compound having two or more isocyanate groups in the molecule.

* * * * *